UNITED STATES PATENT OFFICE.

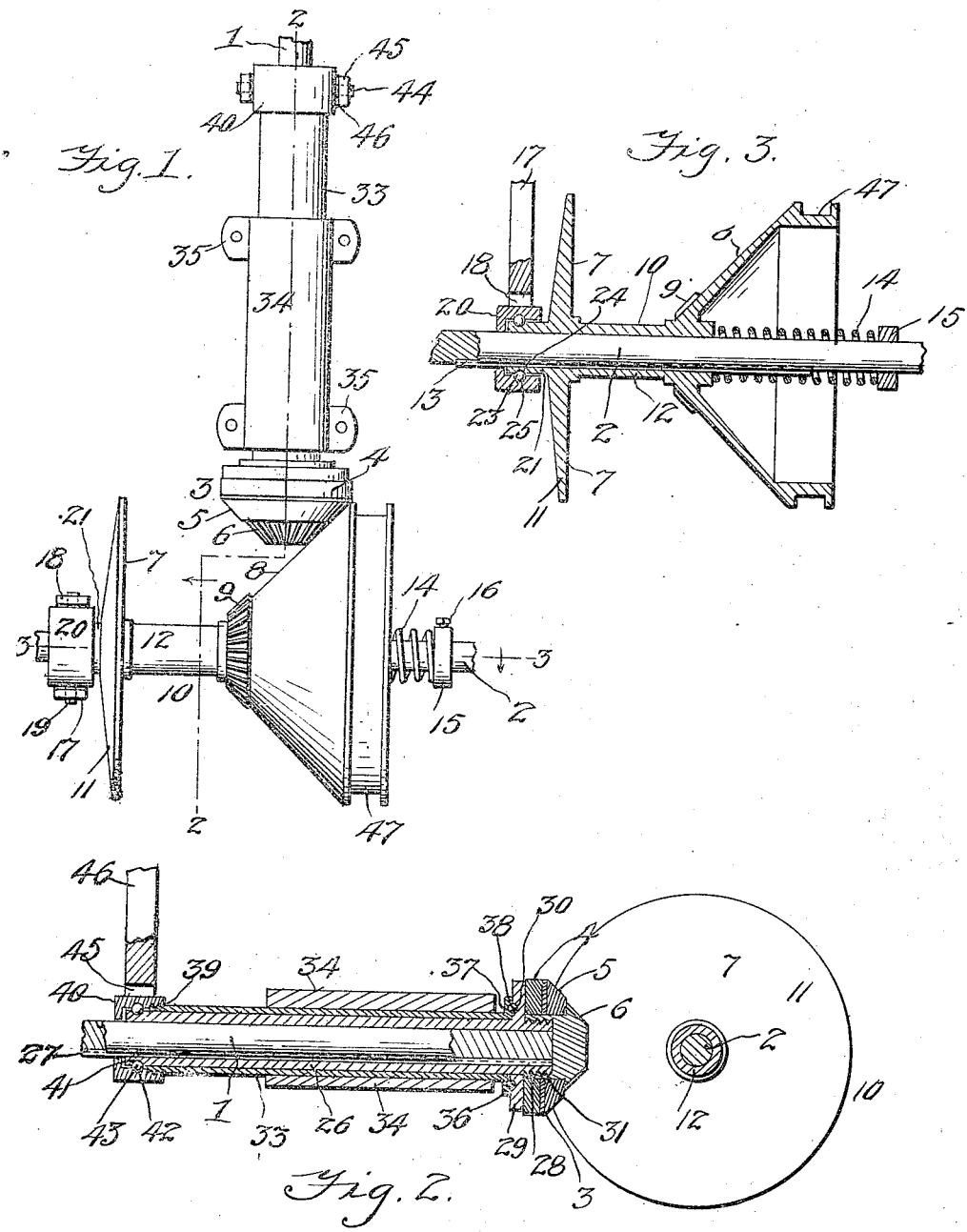

DAVID M. DEARING, OF JACKSON, MICHIGAN.

VARIABLE-SPEED POWER-TRANSMISSION DEVICE.

No. 886,191.         Specification of Letters Patent.         Patented April 28, 1908.

Application filed February 15, 1906, Serial No. 301,282. Renewed April 1, 1907. Serial No. 365,856.

*To all whom it may concern:*

Be it known that I, DAVID M. DEARING, a citizen of the United States, residing at Jackson, in the county of Jackson and State of Michigan, have invented certain new and useful Improvements in Variable-Speed Power-Transmission Devices; and I do declare the following to be a full, clear, and exact description of the invention, such as will enable others skilled in the art to which it appertains to make and use the same.

My invention relates to improvements in variable speed power transmission devices for use on motor vehicles and other machinery.

The object of the invention is to provide a simple, light, durable and efficient device of this character, by means of which power may be transmitted from a driving to a driven shaft to cause the latter to turn in either direction at a speed which may be varied as desired.

With the above and other objects in view, the invention consists of certain novel features of construction, combination and arrangement of parts as will be hereinafter described and claimed.

In the accompanying drawings:—Figure 1 is a bottom plan view of my improved variable speed power transmission gearing adapted for use on an automobile or motor vehicle; and Figs. 2 and 3 are vertical sectional views taken respectively on the planes indicated by the lines 2—2 and 3—3 in Fig. 1.

Referring to the drawings by numeral, 1 and 2 denote, respectively, driving and driven shafts, which are disposed in planes at right angles to each other, and journaled in suitable stationary bearings. Upon the driving shaft 1 is a driving member 3, mounted to rotate with said shaft, but adapted to slide longitudinally thereon. This member 3 has three working surfaces 4, 5 and 6 which coact with complementary working surfaces 7, 8 and 9 upon a driven member 10, which latter is slidably mounted upon but adapted to rotate with the driven shaft 2. The coacting working surfaces 6, 9 of said members 3, 10 are toothed or in the form of beveled gears, while the remaining working surfaces are smooth or friction surfaces, the coacting surfaces 5, 8 being beveled and the coacting surfaces 4, 7 being flat. The working surface 7 of the member 10 is disposed in a plane at right angles to the axis of the shaft 2 and is formed by the flat inner face of the disk 11 located adjacent to one end of the body 12 of the member 10 and opposed to the beveled gear 9 and the friction cone 8, which surfaces 8, 9 are disposed adjacent to the opposite end of the body 12. The latter is in the form of a hub or sleeve which is keyed, as shown at 13, to rotate with the shaft 2, but is free to slide longitudinally thereon, to permit either the friction disk or surface 7 or one of the working surfaces 8, 9 to engage with its complementary working surface upon the driving member 3. The driven member 10 is forced longitudinally in one direction upon the shaft 2, by means of a coiled spring 14, so that either the beveled gears 6, 9 or the friction cones 5, 8 are normally engaged with each other. This spring 14 surrounds the shaft 2 within the large friction cone 8 and is confined between the adjacent end of the body 12 and an adjustable stop collar 15. The latter slides upon the shaft 2 and may be adjustably secured thereon by a set screw or the like 16, so that the tension of the spring 14 against the member 10 may be varied, as desired. The driven member 10 is moved in the opposite direction upon the shaft 2 against the tension of the spring 14 to disengage the working surfaces 6, 9 and 5, 8, and cause the inner friction surface 7 of the disk 11 to engage the flat friction surface 4 on the periphery of the member 3. This movement of the member 10 may be effected by any suitable mechanism, but as shown, I employ a lever 17, which has its forked or bifurcated end 18 apertured to receive diametrically opposite pivot studs 19 upon a cap or collar 20 which surrounds the outer projecting end 21 of the sleeve or body 12. The end 21 is free to rotate in the cap 20, but is adapted to move longitudinally therewith by providing an annular row of bearing balls 23 in coacting annular grooves or raceways 24—25 formed respectively in said end 21 and said cap 20, as clearly shown in Fig. 3.

The working surfaces 4, 5, 6 of the member 2 are carried by an inner sleeve or tube 26, which slides freely upon the shaft 1, but is keyed to rotate therewith, as shown at 27. Said sleeve 26 is formed at its inner end with external screw threads 28 and a radially projecting flange or collar 29 having in its outer face a concentric groove or raceway 30. The screw threads 28 are engaged with similar internal screw-threads formed in the hub 31 of the beveled gear 6, which latter confines between its rear face and the inner face of the flange 29, the beveled surface or cone 5, the peripheral friction surface 4 and an intermediate washer, as clearly shown in Fig. 2 of the drawings. The inner sleeve 26 extends through an outer sleeve 33, which latter is slidably mounted in a stationary cylindrical bearing 34 provided with apertured attaching lugs 35 to permit it to be secured to a suitable support. At the inner end of the outer sliding sleeve 33 is formed a radial flange 36 provided in its inner face with an annular groove 37, between which latter and the similar groove 30 in the flange 29, is provided a row of bearing balls 38. The outer end of the sleeve 33 is externally screw-threaded, as at 39, to receive a cap or collar 40, into which the outer end of the inner sleeve 26 projects. This end of the sleeve 26 is formed with an annular groove 41, between which and a similar groove 42 inside of the cap 40 are confined bearing balls 43. The cap 40 is provided upon its outer face, at diametrically opposite points, with pivot studs 44, which project into apertures in the bifurcated end 45 of a lever 46. It will be seen that by operating the lever 46, the sleeve 33 and hence the member 3 may be moved longitudinally, so that its friction surfaces 4, 5 may be shifted toward and from the centers of their coacting surfaces 7, 8 to vary the speed of the driven shaft 2. If desired, an annular brake-band surface 46 may be formed or provided upon the outer or large end of the friction cone 8 to receive a brake-band or shoe of any description.

The operation and advantages of the invention will be readily seen. When the parts are in their normal positions as shown in Fig. 1 of the drawings and the driving shaft 1 is rotated, the cone 5 will engage the outer or larger portion of the cone 8 and rotate the shaft 2 at a slow speed. When it is desired to increase the speed, the lever 46 is shifted to move the member 3 toward the shaft 2, so that the cone 5 will ride inwardly upon the cone 8 and force the member 10 longitudinally on the shaft 2 against the tension of the spring 14. As the cone 5 moves inwardly, the speed of the shaft 2 will be gradually increased until the beveled gears 6 and 9 mesh with each other. The shaft 2 will thus be positively driven at a high speed and there will be no shock or jar when the gears are moved into and out of mesh with each other, owing to the fact that the members have the same speed. When it is desired to reverse the direction of movement of the driven shaft 2, the lever 17 is shifted to disengage the working surfaces 5 and 8 or 6 and 9, and to cause the friction surface 7 of the friction disk to be moved into engagement with the peripheral friction surface 4. When the latter surfaces are thus engaged, the speed of the rearward rotation of the shaft may be varied as desired, by shifting the lever 46, as will be readily understood.

While I have described the shaft 1 as the driving shaft, it will be understood that it may be the driven shaft.

Having thus described my invention, what I claim as new and desire to secure by Letters Patent is:—

1. A transmission gearing, including a driving shaft, a driven shaft arranged at substantially right angles to the driving shaft; a beveled frictional wheel having a bevel pinion fixed to the driven shaft, and a beveled friction wheel having a bevel pinion fixed to the driving shaft adapted to successively engage with the wheel and pinion carried by the driven shaft.

2. In a device of the character described, a member having peripheral, beveled and toothed working surfaces, a second member having beveled and toothed working surfaces to coact with the corresponding surfaces on the first mentioned member and a flat working surface opposed to its beveled and toothed faces for coaction with the peripheral surface of the first mentioned member, and means for varying the relative positions of said members for the purpose set forth.

3. In a device of the character described, a member having peripheral, beveled and toothed working surfaces, a second member having beveled and toothed working surfaces to coact with the corresponding surfaces on the first mentioned member and a flat working surface opposed to its beveled and toothed faces for coaction with the peripheral surface of the first mentioned member, means for holding the complementary working surfaces of said members normally in engagement with each other, and means for varying the relative positions of said members, substantially as described and for the purpose set forth.

4. In a device of the character described, a member having peripheral, beveled and toothed working surfaces, a second member having beveled and toothed working surfaces to coact with the corresponding surfaces on the first mentioned member and a flat working surface opposed to its beveled and toothed faces for coaction with the peripheral surface of the first mentioned member, a spring for holding the complementary working surfaces of said members normally in engagement with each other, means for shifting the spring actuated member against the tension of its actuating spring, and means for shifting the other member toward and from the spring actuated member, substantially as described.

5. In a device of the character described, a driving member having peripheral, beveled and toothed working surfaces, a driven member having beveled and toothed surfaces to coact with the corresponding surfaces on said driving member, and a flat working surface opposed to its beveled and toothed surfaces for coaction with the peripheral surfaces of said driving member, a driving shaft upon which said driving element is slidably but non-rotatably adjustable, a driven shaft upon which said driven member is slidably but non-rotatably mounted, an adjustable stop upon said driven shaft, and a coil spring between said stop and said driven member, substantially as described and for the purpose set forth.

6. In a device of the character described, right angularly disposed driving and driven shafts, a sleeve slidably but non-rotatably mounted upon said driving shaft, a driving member upon said sleeve consisting of a toothed beveled gear, a friction cone and a peripheral friction surface, a hub or sleeve slidably but non-rotatably mounted upon said driven shaft and consisting of a sleeve having a right angularly disposed friction disk adjacent to one end and a beveled toothed gear and friction cone adjacent to its opposite end, and means for holding complementary or coacting working surfaces of said members normally in engagement with each other.

7. In a device of the character described, right angularly disposed driving and driven shafts, a sleeve slidably but non-rotatably mounted upon said driving shaft, a driving member upon said sleeve consisting of a toothed beveled gear, a friction cone and a peripheral friction surface, a hub or sleeve slidably but non-rotatably mounted upon said driven shaft and consisting of a sleeve having a right angularly disposed friction disk adjacent to one end and a beveled toothed gear and friction cone adjacent to its opposite end, a spring upon said driven shaft for holding said members normally in engagement with each other, a lever for shifting said driving member upon its shaft, and a lever for shifting said driven member upon its shaft, substantially as described.

In testimony whereof I have hereunto set my hand in presence of two subscribing witnesses.

DAVID M. DEARING.

Witnesses:
FRANK EGGLESTON,
CHRISTIE O. STEARNS.